United States Patent
Hartog

[11] Patent Number: 5,146,521
[45] Date of Patent: Sep. 8, 1992

[54] OPTICAL FIBRE COMMUNICATION NETWORK

[75] Inventor: Arthur H. Hartog, Southampton, England

[73] Assignee: York Limited, United Kingdom

[21] Appl. No.: 713,122

[22] Filed: Jun. 10, 1991

[30] Foreign Application Priority Data

Jun. 18, 1990 [GB] United Kingdom ............... 9013578

[51] Int. Cl.[5] .................. G02B 6/26; H04J 1/00; H01J 5/16
[52] U.S. Cl. ............................ 385/48; 385/12; 385/31; 385/122; 250/227.14; 250/227.18; 250/231.19; 359/124; 359/127
[58] Field of Search ............ 350/96.15, 96.16, 96.20, 350/96.21, 96.29; 250/227.11, 227.14, 227.15, 227.16, 227.17, 227.18, 231.19; 370/1, 3, 4; 385/27, 28, 29, 24, 31, 32, 48, 122, 88, 89, 12, 13; 359/112, 124, 126, 127; 356/338, 343

[56] References Cited

U.S. PATENT DOCUMENTS

| | | | |
|---|---|---|---|
| 3,777,149 | 12/1973 | Marcatili | 385/29 |
| 4,076,375 | 2/1978 | Muska et al. | 350/96.15 |
| 4,102,579 | 7/1978 | Stewart | 385/32 |
| 4,298,794 | 11/1981 | Snitzer et al. | 250/227.14 |
| 4,443,700 | 4/1984 | Macedo et al. | 250/227.11 X |
| 4,459,477 | 7/1984 | Asawa et al. | 385/32 |
| 4,475,789 | 10/1984 | Kahn | 350/96.15 |
| 4,557,550 | 12/1985 | Beals et al. | 385/48 |
| 4,749,246 | 6/1988 | Epworth et al. | 350/96.15 |
| 4,749,248 | 6/1988 | Aberson, Jr. et al. | 385/28 |
| 4,750,795 | 6/1988 | Blotekjaer | 350/96.15 |
| 4,768,854 | 9/1988 | Campbell et al. | 385/32 |
| 4,802,723 | 2/1989 | Miller | 385/32 |
| 4,815,805 | 3/1989 | Levinson et al. | 350/96.16 |
| 4,889,403 | 12/1989 | Zucker et al. | 385/32 |
| 4,898,442 | 2/1990 | Scanlan et al. | 385/32 |
| 5,040,866 | 8/1991 | Engel | 385/32 |

*Primary Examiner*—Brian Healy
*Attorney, Agent, or Firm*—Iandiorio & Dingman

[57] ABSTRACT

An optical fibre communication network comprising one optical source (1) connected to one end of an optical fibre (3), and several optical receivers (9) for detecting light scattered to the side of the optical fibre (3), the network being characterized by the fact that each optical receiver (9) is sufficiently sensitive to require for reliable communication only light lost by the fundamental scattering of the fibre (3) during normal propagation of the light originating in said optical source (1) while travelling in the vicinity of the optical receiver (9).

10 Claims, 5 Drawing Sheets

OPTICAL FIBRE COMMUNICATION NETWORK

The present invention relates to the control of a number of stations linked by a single optical fibre, which usually, but not necessarily, would form part of a distributed fibre optic sensing system (such as is described in UK patent GB-2 122 337 A and subsequent improvements, e.g. GB 2 140 554A or EP 86 30 3695). The function of these stations is, on receipt of an instruction addressed individually to each station, to perform a remotely determined function.

BACKGROUND OF THE INVENTION

There are a number of practical applications in which it is desirable to broadcast low frequency information over a fibre optic network with the minimum possible amount of light tapped from the fibre at each receiving station. This is the case when the fibre is used primarily for a different function, such as in a distributed fibre optic sensor, where the entire length of the fibre is used to measure the distribution of a quantity of interest, e.g. temperature. Where a large number of stations are connected to a single fibre data bus, it is vital that each of these remove as little power from the data bus as possible since this allows a maximum number of stations to be connected. Methods proposed to date include various tapping mechanisms to allow a fraction of the power carried by the fibre to be diverted to an optical receiver assembly, usually consisting of a detector, an amplifier and some data recovery circuitry. Alternatives include active network nodes, where the signal is detected, and passed on down the fibre after regeneration.

All of the methods proposed to date involve diverting power out of the fibre, with or without a break in the fibre. Methods previously proposed for effecting the diversion of power from the fibre include introducing bends in the fibre (and thus inducing some of the power to be diverted from the core), removing part of its guiding cladding (to gain access to the core where the power is normally confined) or heat treating the fibre in order locally to enhance its scattering loss.

These methods are not acceptable in situations where a very considerable number (say greater than 200) of receiving stations are required to be connected to the fibre or where the fibre is also used for distributed sensing, where such power diversion would also affect the power used to probe the fibre for the purpose of sensing, so reducing the signal available in the remainder of the fibre and thus degrading the performance of the sensing system. Moreover in the latter case, diversion of power from the fibre will distort the sensor output by introducing localised losses along the fibre which could be interpreted by the signal processing system as real changes in the parameter to be measured. Moreover, most of the means available to date of diverting the power from the fibre also degrade the mechanical integrity of the fibre and thus may result in the occasional fracture of the fibre in service, a clearly detrimental side effect.

In the present patent application, the concept of using only that light which is inevitably scattered from the fibre through its side to provide one way communication to an array of receiving station sited along the fibre is disclosed. The distinguishing feature of the approach disclosed is that no additional light is required to be tapped from the fibre other than that which would in any case be lost through inevitable propagation mechanisms. In practice, the simple act of gaining access to the fibre (i.e. removing any opaque sheathing materials which the fibre may be protected by in a cable) may induce some excess loss over and above that which would be present in the fibre without such a tap; however it is an essential characteristic of the network disclosed herein that its operation does not require the presence of any excess loss. In other words, the network is designed in such a way that the detectors are directed at the side of an intact fibre and the sensitivity of the receivers is sufficient that they may detect signals using only side scattered light.

This approach to broadcasting information over a fibre optic network has not previously been proposed owing to the very limited data rate it can support, which would, in most communications applications, be totally unsuitable. In the context of the present application, however, the limited data rate is not a serious drawback.

SUMMARY OF THE INVENTION

Accordingly, the present invention provides an optical fibre communication network comprising one optical source connected to one end of an optical fibre, and several optical receivers for detecting light scattered to the side of the optical fibre, the network being characterised by the fact that each optical receiver is sufficiently sensitive to require for reliable communication only light lost by the fundamental scattering of the optical fibre during normal propagation of the light originating in the optical source whilst travelling in the vicinity of the optical receiver whereby the network is free of means inducing excess loss in the optical fibre for the purpose of enabling the optical receivers to detect the light scattered to the side of the optical fibre.

The present invention also provides an optical fibre communication network comprising two optical sources connected one to each end of an optical fibre, and several optical receivers for detecting light scattered to the side of the optical fibre, the network being characterised by the fact that each receiver is sufficiently sensitive to require only light emitted at one or more of the optical sources and lost during normal propagation in the vicinity of the optical receivers whereby the network is free of means inducing excess loss in the optical fibre for the purpose of enabling the optical receivers to detect the light scattered to the side of the optical fibre.

Each optical receiver may be identified by a unique address.

The electrical outputs of the optical receivers may be used to effect the control of equipment sited in close proximity to the optical receivers. The optical fibre may also be used as the sensing means in a distributed fibre optic sensor.

The optical fibre may be installed alongside a separate optical fibre providing the sensing means of a distributed fibre optic sensor. The distributed fibre optic sensor may use the principle of back scattered radiation for the measurement of the sensed quantity. Alternatively, the distributed fibre optic sensor may use the principle of forward scattered radiation for the measurement of the sensed quantity. Still further, the distributed fibre optic sensor may use the principle of non linear optical interaction of counter propagating or co-propagating radiation for the measurement of the sensed quantity.

The physical quantity sensed by the distributed fibre optic sensor may be temperature, pressure, strain, magnetic field, electric field or the intensity of ionising radiation.

The distributed fibre optic sensor may utilise the Raman scattering effect to determine the physical quantity sensed, or it may utilise the Brillouin scattering effect to determine the physical quantity sensed. Alternatively, the distributed fibre optic sensor may utilise the changes in fibre birefringence to determine the physical quantity sensed, or it may utilise the losses induced by bends in the fibre to determine the physical quantity sensed, or it may utilise changes in absorption in the fibre to determine the physical quantity sensed, or it may utilise changes in the power conversion between eigenmodes of the fibre.

Preferably, the optical source is a semi-conductor laser. Preferably, the operating wavelength of the laser is less than 1 micrometer.

The optical fibre communication network may be one in which the data rate is less than 1 M bit per second.

The source or sources in the transmitting station or stations may be controlled directly or indirectly as a result of the measurement of the distributed fibre optic sensor. The source(s) in the transmitting station may operate at a separate wavelength from that or those used in by the distributed fibre optic sensor and may be launched into the fibre by means of a wavelength selective beamsplitter or a wavelength-division multiplexing device.

The light generated by the source(s) in the transmitting station may be launched into the fibre occasionally by means of a fibre switch.

The optical fibre communication network may be used to control one or more of the heating, air conditioning, ventilation, lighting, fire-alarm and fire-fighting functions in a building, in a ship, or in an aircraft. The optical fibre may also be used to control the operation and defrosting of freezers and chilled display cabinets in food stores.

The optical communication system may include acknowledgement means for the receiving stations to acknowledge receipt and acceptance of a command. The acknowledgement may be effected by means of a separate source sited in each receiving station and launching light into the fibre by means of side scattering. Alternatively, if the fibre is used as a sensing means or is sited alongside a sensing fibre, the optical fibre communication network may be one in which the acknowledgement means induces a change of a physical parameter of the fibre, which the distributed sensor is designed to detect.

The type of network described in the present application may be advantageously combined with a fibre used for distributed sensing or for other communications purposes.

It is envisaged that the invention will be of significant benefit where distributed sensor systems monitor areas which presently require separate controls such as room temperature controls in so-called 'intelligent buildings' (i.e. buildings where a number of services are controlled by networks of computers), freezer cabinets in large food stores, chilled warehouses and so on. A system such as that proposed in the present application extends the advantages of distributed fibre optic sensors (of simplicity of wiring and use of a cable immune to electro-magnetic interference) to the control function, with only minor additional wiring. In the applications cited above and many others, the cost of wiring and installation is usually a significant (sometimes dominant) part of the overall cost of a sensing and control system. The present invention thus helps overcome the one major disadvantage of distributed fibre optic sensors, namely that they only collect data: they generally have no facility for controlling remotely, especially on the same fibre as is used for sensing.

BRIEF DESCRIPTION OF THE DRAWINGS

Embodiments of the invention will not be described solely by way of example and reference to the accompanying drawings in which.

DETAILED DESCRIPTION OF THE DRAWINGS

Figure 1:
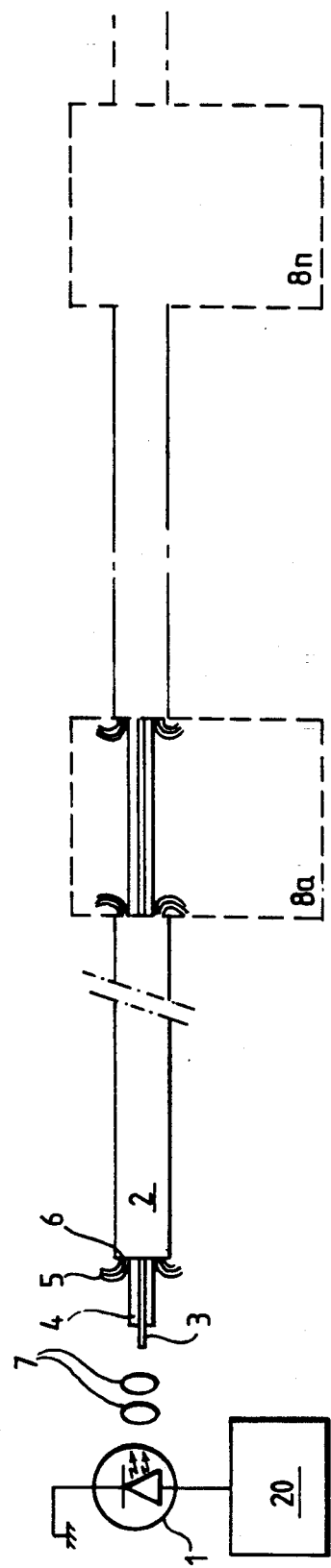
FIG. 1 shows a basic arrangement for a control network.

FIG. 1 shows a basic arrangement for the control network, where a light source 1 (typically a semiconductor laser diode of the type commonly used in laser printers or compact disc players) launches its output by means of an optional lens system 7 into a fibre cable 2 consisting of at least a fibre 3 (including a primary coating 4) and optional re-inforcing elements 5-6 the exact nature of which will depend on the environment the system is used in. The cable is arranged to join the stations 8a . . . 8n to be addressed.

Figure 2:
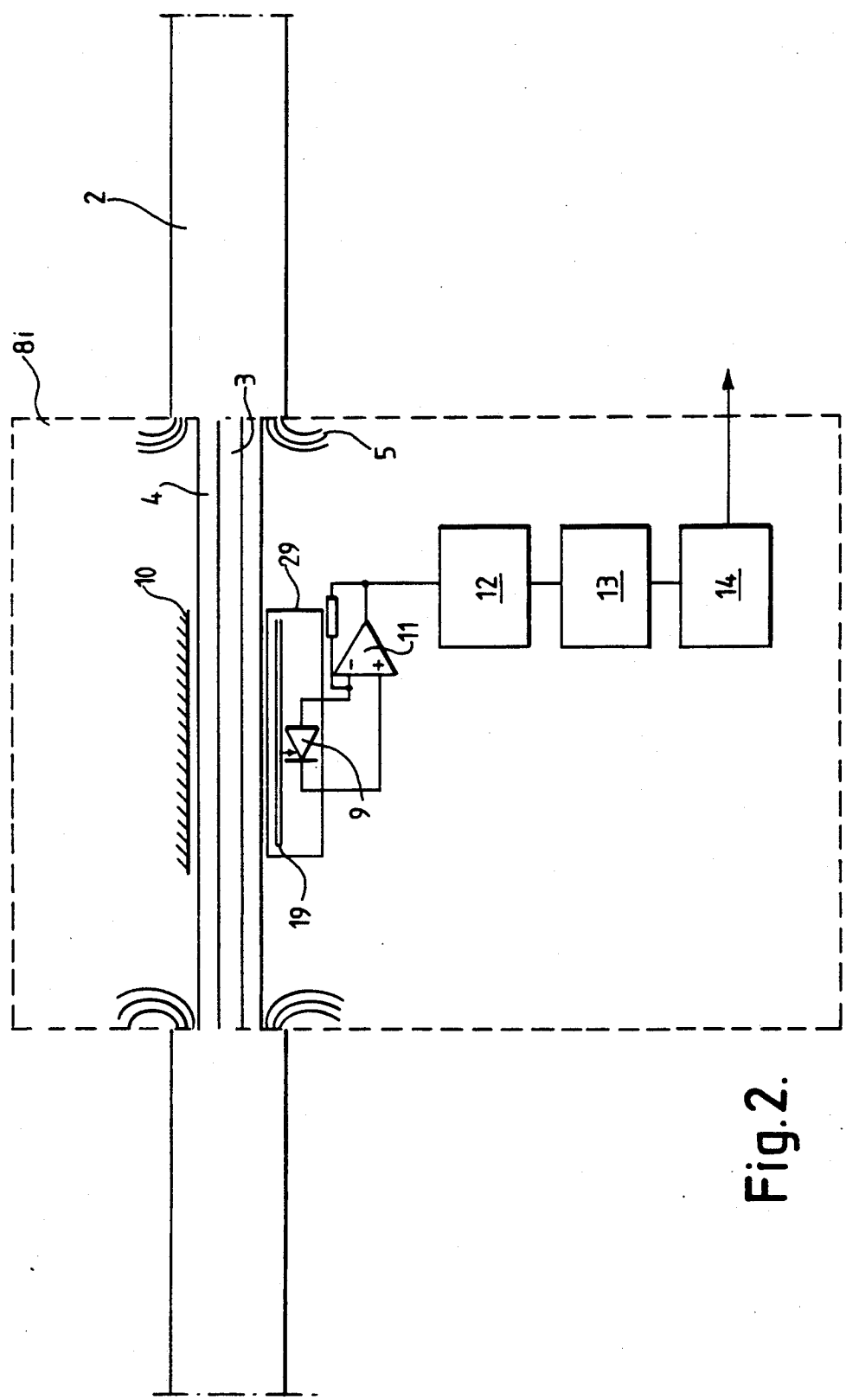
FIG. 2 shows in detail a station.

At each station (of FIG. 2 for more detail), any optional re-inforcement (but not the primary coating) around the fibre is removed and the side of the exposed fibre is placed in proximity to an optical detector 9, which may be encapsulated in a package 29 and optionally fitted with a bandpass filter 19 having a transmission spectrum encompassing the emission wavelength of the light source 1, e.g. a laser. Optionally, a reflector 10 may be fitted over the detector 9 and fibre 3 to improve its light gathering efficiency. The light impinging on the detector has been launched into the fibre 3 and scattered in the vicinity of the detector 9. A fraction of this scattered light falls naturally onto the detector 9 or reaches it via the reflector 10.

It must be understood that light propagation in optical fibres is inevitably accompanied by a gradual loss of the optical signal caused at least in part by scattering, a phenomenon which is attributable to inhomogeneities in the refractive index of the glass on a scale much smaller than the optical wavelength. The inhomogeneities in turn result from fluctuations in density and composition which are thermodynamically unavoidable and are directly related to the temperature at which the fibre was drawn. This scattered light, lost through natural propagation mechanisms, is used to advantage for the present application. For the sake of clarity, an upper bound of 0.05 dB may be put in the present application on the excess loss at any receiver.

After reaching the detector, the light is converted to an electrical current and amplified in ways well known in the field of optical communications, for example by means of a transimpedance amplifier (11) or an integrating amplifier followed by an equalising circuit (not illustrated). The electrical signal signal thus obtained is then fed to an address and command recognition circuit (12) whose function it is to interpret the data receiver by the detector, to decide whether or not this data is addressed to this particular station and, if so, the nature of the command (normally in the form of data held in a register 13). An output control circuit 14 causes external events to occur according to the instructions sent by a transmitting station 20, see FIG. 1. The power source for the remote stations 8 a-n may be derived from the local mains power, an internal battery, wires incorporated in the cable 2 or any other convenient means.

The approach disclosed here is especially suited to low data rate communications (say at rates below 1 Mbaud), since the power available to each remote station 8 is necessarily very weak compared with that launched by the light source 1. To illustrate the effect of worsening detected signal quality as a function of increasing data rate, there is used the example of the following components, each easily available commercially at the time of the application. In this example, the light source 1 is a semiconductor laser emitting 40 mW continuously at a wavelength of 830 nm, typical of those sold by a number of companies for use in laser printers; the fibre 3 is of the multimode, graded index, type with a 50 micrometer core diameter and a relative refractive index difference of 1% (one of the industry standard designs). The detector 9 is assumed to have an active area of 1 mm in diameter, a dark current of 1 nA and the preamplifying circuit is assumed to consist of a field effect transistor characterised by a transconductance of 5 mS and an input capacitance (including that of the detector) of 10 pF. The preamplifier is assumed to be of the transimpedance type with a transimpedance gain of 100 MΩ. Under all these assumptions, it may be calculated that the signal current detected by the receiver in a station sited at a distance of 2 km from the transmitting source is 0.3 nA approximately, assuming a collection efficiency of 20%.

The noise of the entire preamplifier refered to its input may be estimated to be approximately 0.25 pA, 0.75 pA, 2.5 pA, 8.5 pA, 96 pA and 3 nA at 100 Baud, 1 kBaud, 10 kBaud, 100 kBaud, 1 MBaud and 10 MBaud respectively; Since a signal to noise ratio of roughly 8:1 is required for reliable communications (e.g. for a bit error rate of $10^{-9}$) it may be seen that in the above example the limiting data rate is of order 200 kbit/s.

The optical communication network of the present invention may thus be distinguished in purpose and design from the very high data rate point to point communications for which optical fibres are conventionally used. Again, the attributes of the disclosed system, mitigate in favour a short wavelength of operation, such as less than 1 μm owing to the better performance of sources and detectors in the region of 600 to 930 nm and the increasing strength of the scattering processes themselves with decreasing wavelength.

In certain circumstances, it may be convenient to use two transmitters, one of which is connected to each end of the fibre; this is especially the case if the fibre is of a greater length than that over which the control signal could be transmitted reliably from the transmitting station to the most remote station owing to the attenuation of the fibre.

As was indicated above, one of the main applications for the proposed network is in combination with a fibre optic distributed sensor, where an optional fibre is used to measure the distribution of physical parameters of interest by analysis of scattered radiation. A number of such devices have been described in the technical literature and usually use either forward or back-ward scattered light to determine the length dependence of the quantity of interest. Physical parameters which have been measured by these means, or have been proposed to be measured include temperature, pressure, strain, electric and magnetic field. The physical effects which are put to use in order to provide the sensing mechanism include Raman and Brilouin scattering, fibre birefringence and bending and absorption losses.

Figure 3:
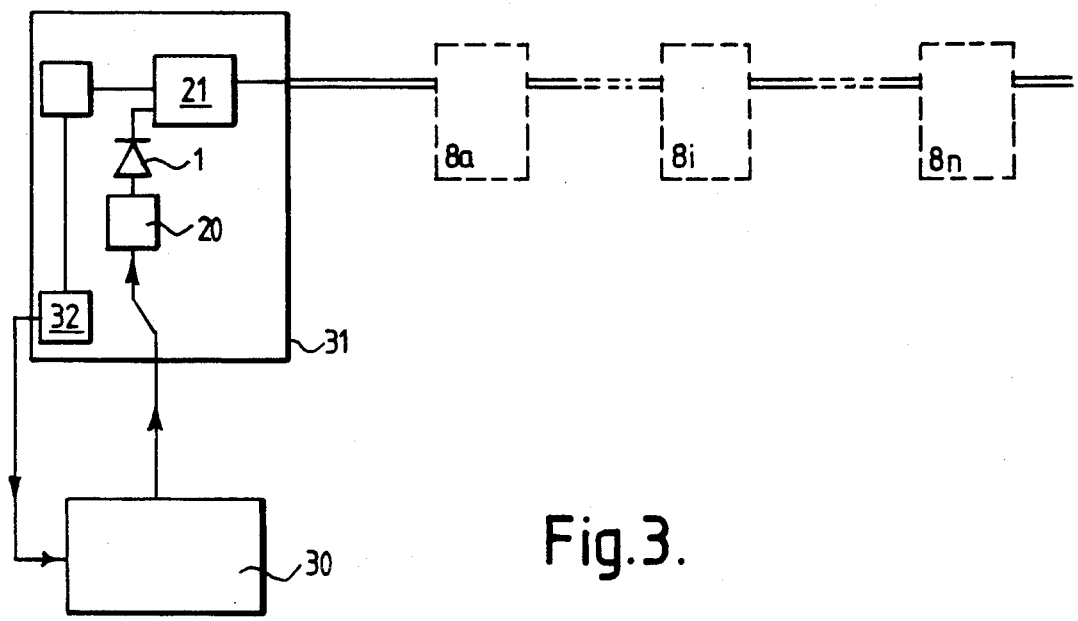
FIG. 3 shows a transmitter station working in conjunction with a wavelength-division multiplexing unit.
Figure 4:
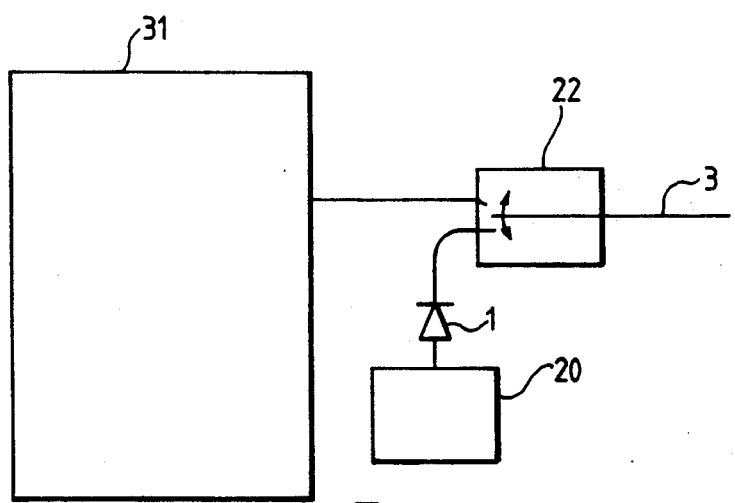
FIG. 4 shows the transmitter station of FIG. 3 working in conjunction with a fibre switch 22.

One example of such a sensor is an instrument sold under the name DTS System 2 by York Ltd, or Chandler's Ford, Hampshire, UK. This instrument measures the distribution of temperature all along the length of an optical fibre, which might typically be 2 km in length, with an accuracy of typically 1° C. In a typical application of this instrument, one or more fibres will be connected to it and deployed through the area to be measured. This might include passing the fibre through each room of a large building or through each chilled and frozen food cabinet of a large food store. This distributed sensing arrangement, devoid as it stands of any means of actuating events at the locations where it senses, may advantageously be combined with the present invention to allow (as illustrated in FIG. 3) a central controller (30) to accept data from a distributed sensor instrument 31 though an interface 32 and cause the transmitter station 20 to send instructions to remote stations 8 a-n as a reaction to information gained. Usually, but not necessarily, the transmitter station will be sited inside the sensor instrument itself; it will gain access to the fibre 3 via a wavelength division multiplexing unit 21 (illustrated in FIG. 3), or via a fibre switch 22 (illustrated in FIG. 4) or a power splitter The system described so far in the present application allows for ample signal to noise ratio owing to the reduced data rates involved and for error detection and correction; these factors in combination are expected to yield very reliable information transfer. It is nevertheless considered good practice, in some communications systems, for the receiver to acknowledge the receipt of the data. It is envisaged that the system proposed may be extended to provide such acknowledgement in two different ways.

Figure 5:
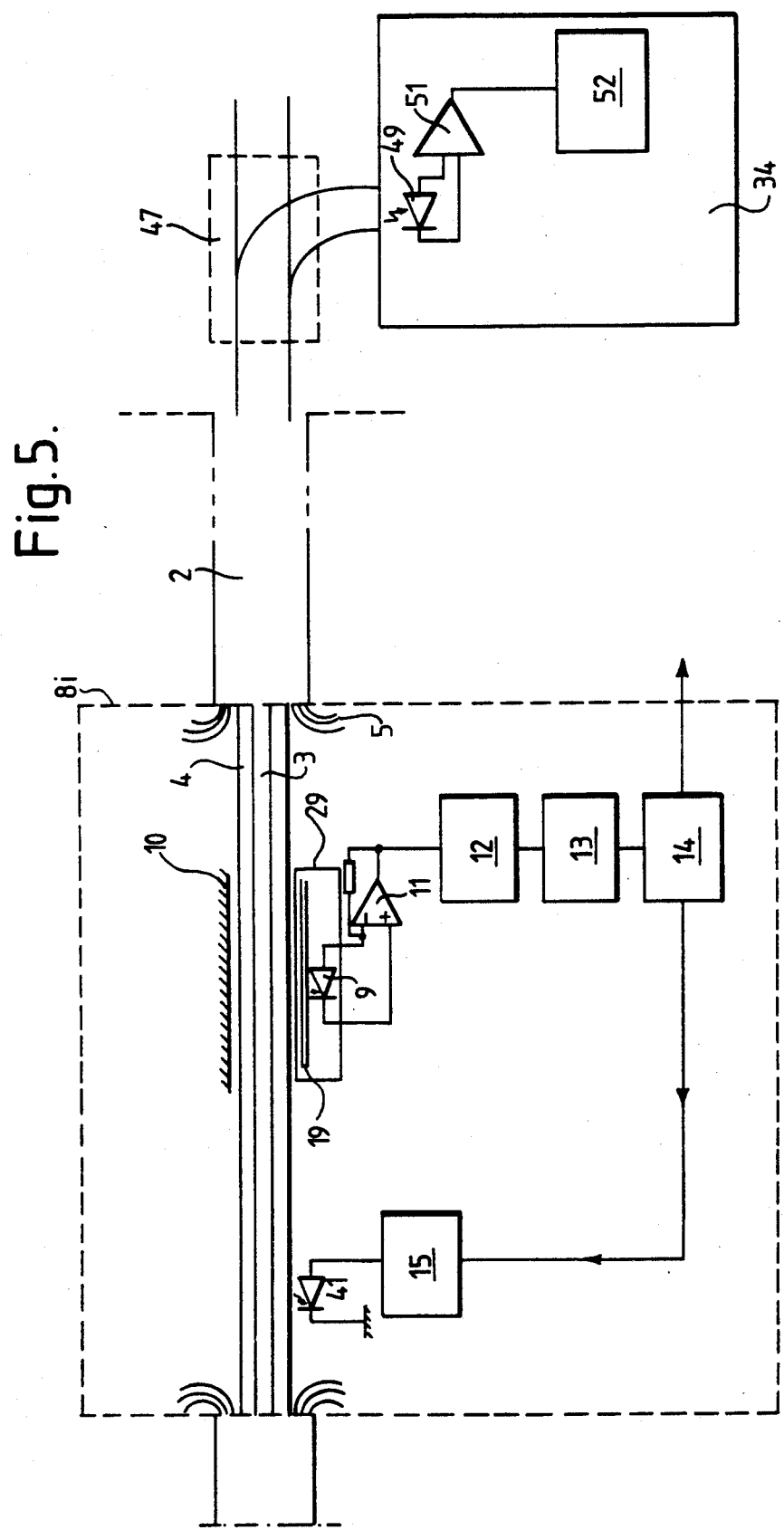
FIG. 5 illustrates a first method in which the optical fibre communication network can acknowledge the receipt of data.

Firstly, FIG. 5 illustrates a similar principle to that disclosed above for the broadcasting of commands, of using side scatter and illuminating the fibre through the side and use the scattering of this transverse illumination to redirect a small proportion of the light scattered in the core towards the end of the fibre. To this end, a source 41 similar to that used for forward transmission, or possibly a light emitting diode, is placed in close proximity to the fibre 3, in a place where any opaque protective layers 5, 6 have been stripped and secured. The source 41 is driven by a circuit 15, itself controlled by the output control circuit 14. At one or both ends of the fibre 3, a directional coupler 47 separates forward travelling light emitted by transmitter 41 from the light send by remote stations, said light being directed to a detector and receiver arrangement 34 consisting of a detector 49, a receiver 51 and decoding circuitry 52. In this case, it is generally preferred that the detector 49 be of a type providing internal gain with low noise, such asn an avalanche photodiode or a photomultiplier tube, both types of which are readily available from a number of manufacturers. It is desirable, though not essential, that the emission wavelength of sources 41 be different from that of source 1 to avoid interference between the commands sent by source 1 and acknowledgements sent by sources 41.

Figure 6:
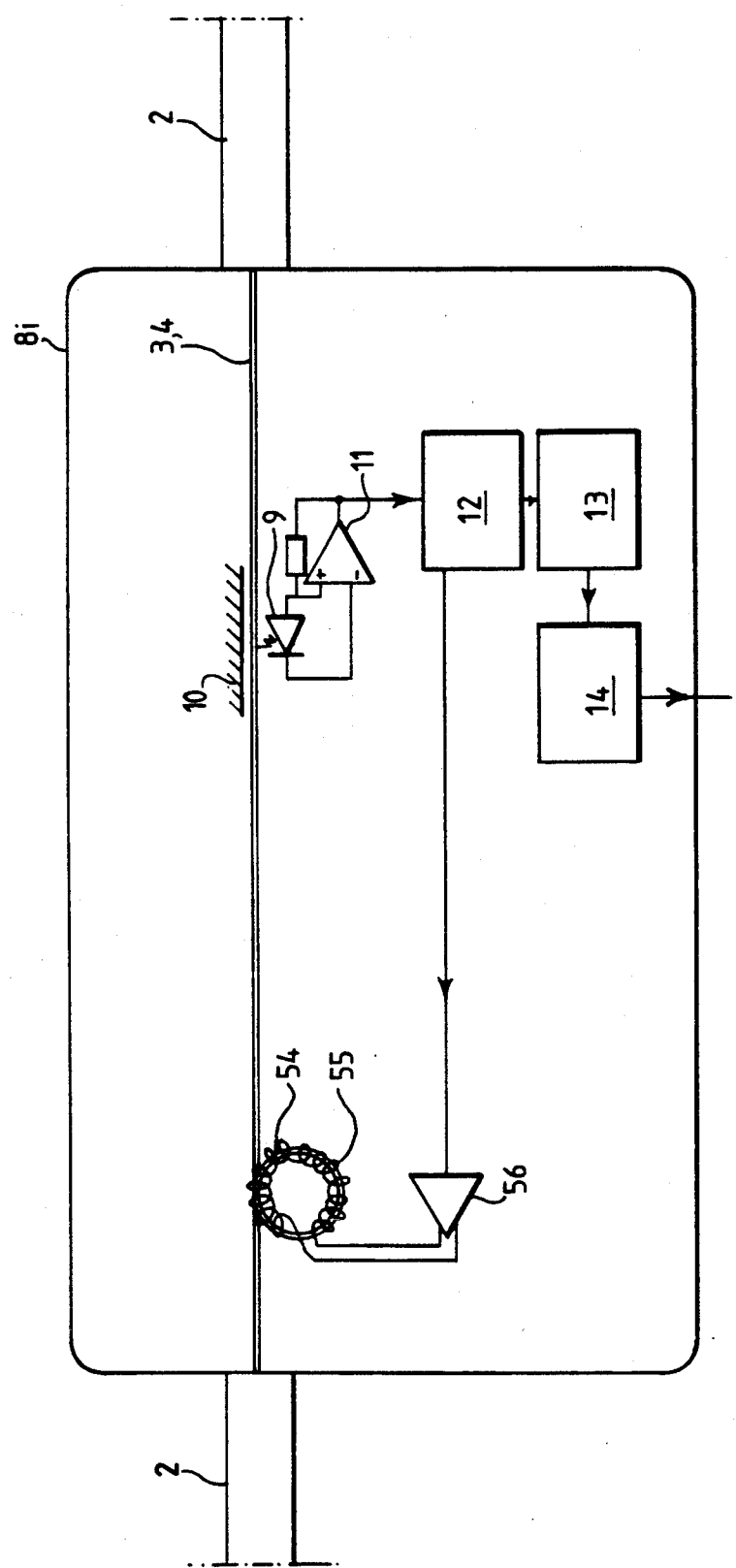
FIG. 6 illustrates a second method in which the optical fibre communication network can acknowledge data.

In those cases where the communication network is used in conjunction with a distribution sensing system, a second means of providing the acknowledgement is envisaged, namely by inducing a change in the parameter which the sensor system is designed to measure. For example, if the sensor is designed to measure temperature, then the acknowledgement may be communicated to the sending station by heating a short section of fibre in the vicinity of the remote station being addressed, the rise in temperature being detected by the sensor system. The heating is illustrated in FIG. 6, where a coil of fibre 54 is shown over wound by a coil 55 of resistive wire. An electric current is driven through the latter wire by an actuation circuit 56 in response to a command correctly detected and interpreted by the address and command recognition circuit 12. Similarly, if the distributed sensing system is designed to measure pressure, local application of pressure on a section of fibre close to the addressed remote station 8i will be sufficient to signal the correct transmission and acceptance of the command. Equally, if the sensing system were designed to detect electric current or longitudinal magnetic field, the precise arrangement of FIG. 6 would provide an acknowledgement.

In some circumstances, it may be preferable to use separate fibres for communication and for sensing, these fibres nevertheless running within a single cable or two cables which for convenience could be installed at the same time in close proximity. The combination of distributed control and distributed sensing allows a much more effective system to be built than either of these concepts in isolation since, alone, these systems allow one way communication only, carrying control information in one case and of information on the sensed physical parameter in the other.

Usually, but not necessarily, the control network will be driven at a different source wavelength from that of the sensor system.

It is to be appreciated that the embodiments of the invention described above with reference to the accompanying drawings have been given by way of example only and that modifications may be effected.

I claim:

1. An optical fibre communication network comprising one optical source connected to one end of an optical fibre, and several optical receivers for detecting light scattered to the side of the optical fibre, the network being characterised by the fact that each optical receiver is sufficiently sensitive to require for reliable communication only light lost by the fundamental scattering of the optical fibre during normal propagation of the light originating in said optical source whilst travelling in the vicinity of the optical receiver whereby the network is free of means inducing excess loss in the optical fibre for the purpose of enabling the optical receivers to detect the light scattered to the side of the optical fibre.

2. An optical fibre communication network according to claim 1 and including a distributed fibre optic sensor.

3. An optical fibre communication network according to claim 2 in which the distributed fibre optic sensor uses a principle for the measurement of the sensed quantity selected from the principles consisting of back-scattered radiation, forward-scattered radiation, and non-linear optical interaction of counter-propagating or co-propagating radiation.

4. An optical fibre communication network according to claim 2 in which the distributed fibre optic sensor is such as to sense a quantity selected from the quantities consisting of temperature, pressure, strain, magnetic field, electric field, intensity of ionising radiation, Raman scattering effect to determine the physical quantity sensed, Brillouin scattering effect to determine the physical quantity sensed, changes in fibre birefringence to determine the physical quantity sensed, losses induced by bends in the fibre to sense the physical quantity sensed, absorption in the fibre to determine the physical quantity sensed, and coupling between eigenmodes of the fibre to determine the physical quantity sensed.

5. An optical fibre communication network according to claim 1 in which the optical source is a semiconductor laser, in which the operating wavelength of the laser is less than 1 micrometer, and in which the data rate is less than one Mbit per second.

6. An optical fibre communication network according to claim 2 in which at least one source in at least one transmitting station is controlled directly or indirectly as a result of the measurement of the distributed fibre optic sensor.

7. An optical fibre communication network according to claim 2 in which at least one source in at least one transmitting station operates at a separate wavelength from that used by the distributed fibre optic sensor and is launched into the fibre by means of a wavelength selective beamsplitter or a wavelength-division multiplexing device.

8. An optical fibre communication network according to claim 2 in which the light generated by at least one source in at least one transmitting station is launched into the fibre occasionally by means of a fibre switch.

9. An optical communication system according to claim 1 and including acknowledgement means for receiving stations to acknowledge receipt and acceptance of a command.

10. An optical fibre communication network according to claim 1 and comprising two of the optical sources connected one to each end of an optical fibre, and the several optical receivers for detecting light scattered to the side of the optical fibre, the network being characterised by the fact that each receiver is sufficiently sensitive to require only light emitted at one or more of the optical sources and lost during normal propagation of the light originating in said optical source or sources whilst travelling in the vicinity of the optical receivers whereby the network is free of means inducing excess loss in the optical fibre for the purpose of enabling the optical receivers to detect the light scattered to the side of the optical fibre.

* * * * *